Dec. 14, 1943.  W. W. KARLEN  2,336,619
FASTENER
Filed July 16, 1940

Inventors
Willis W. Karlen
Edwin O. Blodgett
Attorney

Patented Dec. 14, 1943

2,336,619

UNITED STATES PATENT OFFICE 2,336,619

FASTENER

Willis W. Karlen, Vilas, S. Dak.

Application July 16, 1940, Serial No. 345,750

5 Claims. (Cl. 129—25)

This invention relates to fasteners, particularly bendable prong fasteners for binding paper sheets, and a fastener having more than one set of prongs for independently binding two sets of sheets.

The invention comprehends a bendable prong fastener, particularly adapted to eliminate "build-up" in a file and one provided with a base portion folded to provide two opposed sections each having bendable paper impaling prongs thereon for independently receiving and binding two sets of papers, the said base portion being adapted for engagement over the marginal edge portion of a supporting sheet or the like in order to conveniently support the two sets of papers on opposite faces of the supporting sheet, the base being formed for rigidly engaging the margin of the supporting sheet in order to be rigidly secured thereto.

The invention provides a bendable prong fastener having a base formed of a single thickness of sheet metal folded to provide two base sections each provided with bendable paper impaling prongs and adapted to be disposed on opposite faces of a supporting sheet, said base portions being formed for cooperation with the supporting sheet to firmly grip said sheet between said base section for rigidly attaching said fastener base to said supporting sheet in order that the prongs thereof will support and bind two sets of papers independently on opposite faces of said supporting sheet.

The invention provides a bendable prong fastener having a folded base member formed of sheet metal arranged so that two base sections are in opposed relation and are adapted to engage opposite sides of a supporting sheet, one base section being formed with openings to receive beads formed in the other base section which project into said openings in order to clamp the paper between said beads and opening by an offsetting operation for rigidly securing a supporting sheet to said fastener so that two sets of papers may be independently bound on opposite faces of said supporting sheet.

The invention also comprehends the provision of securing means for mounting the base of a folded sheet metal fastener provided with two sets of prongs on the marginal portion of a supporting sheet with opposed base sections overlying opposite faces thereof, wherein portions of each base section may be bent toward the other to grip the supporting sheet, for each base section may be provided with openings to receive rivets for extension through the supporting sheet, the openings in the base section in order to rigidly secure the base of the fastener to the supporting sheet.

The fastener provided by the present invention is particularly adapted for binding two independent sets of papers thereon. It is also adapted for mounting on a supporting sheet for attaching the two sets of sheets to opposite faces of the supporting sheet.

Figure 1:
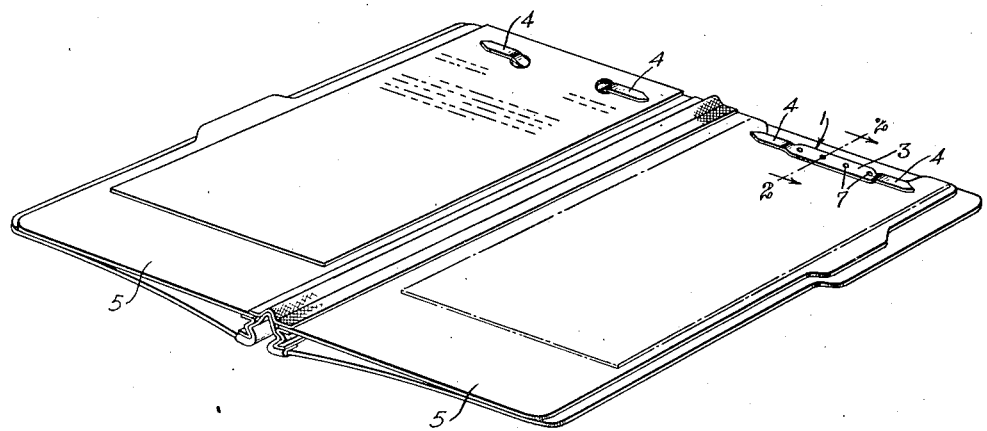
Fig. 1 shows a folder with the covers open, in perspective.

The fastener is formed of thin sheet metal and has a base portion 1 formed to provide a pair of sections 2 and 3 of single thickness connected by a central fold portion. Opposite ends of each base section 2 and 3 are provided with bendable paper impaling prongs 4. The prongs on each base section are adapted to impale and project through one set of sheets and mount said sheets thereon with the free ends of the prongs bent outwardly over the sheets in filed relation, as illustrated in Fig. 1.

Figure 2:
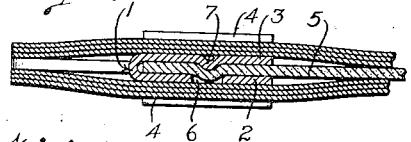
Fig. 2 is an enlarged cross section taken on line 2—2 of Fig. 1.

The fastener is particularly adapted for mounting on an intermediate sheet 5 of a binder folder or for mounting on a tab or tang portion or the marginal portion of any supporting sheet or folder structure. For this purpose, the base portion has the base sections 2 and 3 thereof engaged on opposite sides of the intermediate supporting sheet, as illustrated in the drawings, with the fold portion extending around the edge of the sheet. Base section 2 is formed with a plurality of openings 6 while base section 3 is offset opposite these openings to form beaded portions 7 extending into openings 6 to effectively grip and offset the intermediate sheet or other folder portion to which the fastener is being secured into openings 6 to rigidly secure the fastener base to the intermediate sheet or other folder portion. This is clearly disclosed in Figs. 1 and 2.

Figure 4:
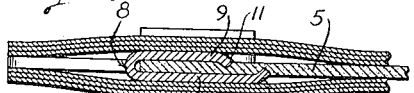
Fig. 4 is an enlarged cross-section taken on line 4—4 of Fig. 3.
Figure 3:
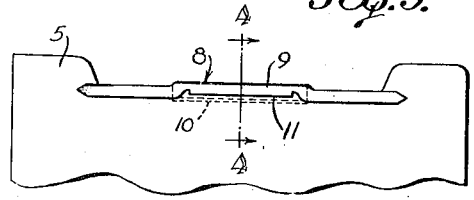
Fig. 3 is a fragmentary plan view of an intermediate sheet separated from the folder and illustrating a fastener applied to the recessed marginal portion at the upper end thereof with a modified attaching means.

Another means of attaching the fastener base section to a folder or intermediate supporting sheet is illustrated in Figs. 3 and 4 wherein fastener base 8 has sections 9 and 10 on opposite sides of the intermediate supporting sheet or folder portion with the fold portion extending around the edge thereof. Base section 9 is of less width than section 10 and both have the free edges thereof turned inwardly at 11, see Fig. 4, to bite into the paper forming the intermediate sheet or folder portion for rigidly attaching the base section of the fastener to the supporting sheet. It will be understood in this connection that either may be left flat while the other may be turned inwardly.

Figure 6:
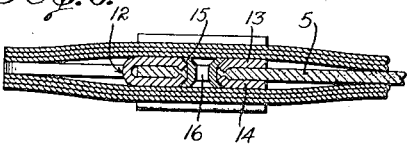
Fig. 6 is an enlarged cross-section taken on line 6—6 of Fig. 5.
Figure 5:
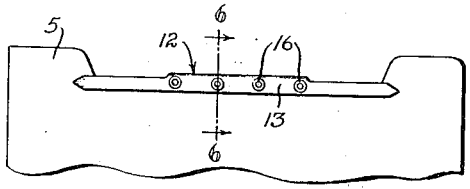
Fig. 5 is a view similar to Fig. 3 showing another means for attaching the fastener to the recessed portion of the intermediate sheet.

A fastener base constructed as hereinbefore described may also be secured by rivets to a folder or intermediate supporting sheet and Figs. 5 and 6 illustrate this construction. The fastener base 12 is formed with base sections 13 and 14 joined by the fold portion, each of the base sections 13 and 14 being provided with openings 15 in aligned relation to receive rivets 16 which have their ends swaged as illustrated in Fig. 6 for rigidly attaching the fastener base to an intermediate sheet or folder portion.

The fastener constructed as above described is adapted to eliminate all extra metal thicknesses in providing and attaching the fastener to a folder or other supporting or backing sheet, particularly in a fastener designed to provide two sets of prongs for individually and detachably mounting two sets of papers thereon. The present invention accomplishes the mounting of the fastener on a backing sheet or the like with the rigid attachment of the fastener base on a marginal portion of said sheet without increasing the metal thicknesses necessary for the fastener to more than that necessary to provide for the support of the prongs and the independent groups of papers on opposite faces of the backing or supporting sheet. In this way a fastener for supporting two sets of papers on opposite faces of a supporting sheet is provided in which the "build-up" is reduced to a minimum by having only a single metal thickness for each set of prongs and in which a novel means of attaching a folded fastener base to a backing or supporting sheet is provided in the form of the formed portions of the fastener base sections for clamping engagement with the supporting sheet or through cooperation with the rivets. The two base sections and fold portion joining cooperates with the securing means above described in obtaining the firm attachment of the fastener on a supporting sheet.

The invention claimed herein provides a fastener particularly adapted for use in binder folders having intermediate sheets provided with recesses wherein the fasteners may be readily engaged over the marginal edge of the sheet in the recess and rigidly attached thereto.

The invention claimed is:

1. A bendable prong fastener comprising a sheet metal base folded in its central portion to form a pair of spaced base sections in superimposed relation adapted to receive a supporting sheet therebetween, means provided on the superimposed portion of one section for cooperation with the adjacent opposite portion of the opposite base section in complementary relation to clamp said supporting sheet therebetween, and bendable prongs on each base section for impaling papers thereon on each side of said base, said means cooperating in securing said fastener on a sheet to provide a thickness no greater than the composite thickness of the base sections and the interposed sheet.

2. A bendable prong fastener comprising a sheet metal base folded in its central portion to form a pair of spaced base sections in superimposed relation adapted to receive a supporting sheet therebetween, at least one of said sections being formed with means projected toward an adjacent superimposed portion of the other section for biting into said paper sheet to rigidly clamp said sheet engaged between said sections, and bendable prongs on each base section for impaling independent groups of papers on the prongs of each base section on each side of said base.

3. A bendable prong fastener comprising a sheet metal base folded in its central portion to form a pair of spaced base sections in superimposed relation adapted to receive a supporting sheet therebetween, each of said base sections being formed to provide cooperating portions projecting toward superimposed portions of one another for gripping said sheet and retaining it between said sections, and bendable prongs on each base section for detachably mounting separate groups of papers on the prongs of each section and on opposite sides of said sheet.

4. A bendable prong fastener comprising a sheet metal base folded in its central portion to form a pair of spaced base sections in superimposed relation adapted to receive a supporting sheet therebetween, one of said sections being formed with an opening and the other section being adapted to have the portion aligned with said opening offset toward the base section into the opening therein for attaching said fastener to said sheet, and bendable prongs formed on each base section for impaling papers thereon in independent groups on opposite sides of said base.

5. A bendable prong fastener, comprising a sheet metal base folded in its central portion to form a pair of spaced base sections in superimposed relation adapted to receive a supporting sheet therebetween, each of said base sections being formed with registering openings, and rivets engaged in said openings and said supporting sheet for rigidly binding said fastener base on said supporting sheet, and bendable prongs on each base section for mounting independent groups of papers on the prongs of each section on opposite sides of said sheet.

WILLIS W. KARLEN.